United States Patent
Takeda et al.

(10) Patent No.: US 11,139,942 B2
(45) Date of Patent: Oct. 5, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 65 days.

(21) Appl. No.: 16/612,611

(22) PCT Filed: May 12, 2017

(86) PCT No.: PCT/JP2017/018114
§ 371 (c)(1),
(2) Date: Nov. 11, 2019

(87) PCT Pub. No.: WO2018/207369
PCT Pub. Date: Nov. 15, 2018

(65) Prior Publication Data
US 2020/0136790 A1    Apr. 30, 2020

(51) Int. Cl.
*H04W 88/06* (2009.01)
*H04L 5/00* (2006.01)
*H04W 72/04* (2009.01)

(52) U.S. Cl.
CPC ......... *H04L 5/0082* (2013.01); *H04W 72/042* (2013.01); *H04W 72/0453* (2013.01); *H04W 88/06* (2013.01)

(58) Field of Classification Search
CPC ... H04L 5/0082; H04L 5/0044; H04L 5/0053; H04L 5/001; H04L 27/2602; H04L 27/26;
(Continued)

(56) References Cited

U.S. PATENT DOCUMENTS 9,455,813 B2* 9/2016 Kim ............... H04L 5/0055
2016/0295442 A1* 10/2016 Virtej ............. H04W 72/1284
(Continued)

FOREIGN PATENT DOCUMENTS

| EP | 3386254 A1 * | 10/2018 | ........... H04L 5/0053 |
| WO | 2017/033839 A1 | 3/2016 | |
| WO | WO-2018182383 A1 * | 10/2018 | ........... H04W 72/042 |

OTHER PUBLICATIONS

Extended European Search Report issued in counterpart European Patent Application No. 17909406.5, dated Nov. 5, 2020 (9 pages).
(Continued)

*Primary Examiner* — Julio R Perez
(74) *Attorney, Agent, or Firm* — Osha Bergman Watanabe & Burton LLP

(57) ABSTRACT

A user terminal communicates by using a plurality of cells, including at least a given cell to use a first TTI and a second TTI having a shorter TTI length than the first TTI, and this user terminal has a receiving section that receives, in the given cell, first downlink control information that is transmitted by using the first TTI and/or second downlink control information that is transmitted by using the second TTI, and a control section that controls receipt of a downlink shared channel that is transmitted in another cell and/or transmission of an uplink shared channel, based on the first downlink control information and/or the second downlink control information.

4 Claims, 14 Drawing Sheets

(58) Field of Classification Search
CPC .......... H04W 72/042; H04W 72/0453; H04W 88/06
See application file for complete search history.

(56) References Cited

U.S. PATENT DOCUMENTS

| | | | |
|---|---|---|---|
| 2017/0164384 A1* | 6/2017 | Wang | H04L 5/001 |
| 2018/0160440 A1* | 6/2018 | Hosseini | H04L 5/0078 |
| 2020/0136790 A1* | 4/2020 | Takeda | H04W 72/0453 |
| 2020/0314948 A1* | 10/2020 | Babaei | H04W 52/00 |
| 2020/0351955 A1* | 11/2020 | Jeon | H04W 76/27 |
| 2020/0389870 A1* | 12/2020 | Shin | H04W 72/042 |
| 2021/0100013 A1* | 4/2021 | Khoshnevisan | H04W 28/04 |
| 2021/0176762 A1* | 6/2021 | Islam | H04B 7/0626 |

OTHER PUBLICATIONS

LG Electronics; "Discussion on sTTI length configuration"; 3GPP TSG RAN WG1 Meeting #89, R1-1707538; Hangzhou, China, May 15-19, 2017 (4 pages).
International Search Report issued in PCT/JP2017/018114 dated Aug. 1, 2017 (1 page).
Written Opinion of the International Searching Authority issued in PCT/JP2017/018114 dated Aug. 1, 2017 (3 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, LTE-A (LTE advanced and LTE Rel. 10, 11, 12 and 13) has been standardized for the purpose of achieving increased capacity and enhancement beyond LTE (LTE Rel. 8 and 9).

Successor systems of LTE are also under study (for example, referred to as "FRA (Future Radio Access)," "5G (5th generation mobile communication system)," "5G+ (plus)," "NR (New Radio)," "NX (New radio access)," "FX (Future generation radio access)," "LTE Rel. 14 or 15 and later versions," etc.).

In existing LTE systems (for example, LTE Rel. 10 and later versions), carrier aggregation (CA) to integrate a number of carriers (component carriers (CCs), cells, and so forth) is introduced in order to achieve broadbandization. Each carrier is configured with the system bandwidth of LTE Rel. 8 as 1 unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which a number of cell groups (CGs) formed by different radio base stations are configured in a user terminal, is also introduced. Every cell group is comprised of at least 1 cell (CC, cell, etc.). In DC, since a number of CCs of different radio base stations are integrated, DC is also referred to as "inter-eNB CA."

In existing LTE systems (for example, LTE Rel. 8 to 13), downlink (DL) and/or uplink (UL) communication are carried out by using 1-ms subframes (also referred to as "transmission time intervals (TTIs)" and so on). These subframes are the time unit for transmitting 1 channel-encoded data packet, and serve as the unit of processing in, for example, scheduling, link adaptation, retransmission control (HARQ (Hybrid Automatic Repeat reQuest)) and so on.

Furthermore, a radio base station (for example, an eNB (eNode B)) controls the allocation (scheduling) of data to user terminals (UE (User Equipment)), and reports data scheduling commands to the UEs by using downlink control information (DCI). For example, when a UE conforming to existing LTE (for example, LTE Rel. 8 to 13) receives DCI that commands UL transmission (also referred to as a "UL grant"), the UE transmits UL data in a subframe that is located a predetermined period later (for example, 4 ms later).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, LTE Rel. 14 and the like), studies are underway to support TTIs (hereinafter also referred to as "short TTIs") that are shorter than the 1-ms TTIs of existing LTE systems (hereinafter also referred to as "long TTIs"), in order to reduce latency (latency reduction).

Also, there is an expectation that future radio communication systems (for example, 5G, NR, etc.) will accommodate various services such as high-speed and large-capacity communication (eMBB (enhanced Mobile Broad Band)), massive access (mMTC (massive MTC)) from devices (user terminals) for machine-to-machine communication (M2M) such as IoT (Internet of Things) and MTC (Machine-Type Communication), and low-latency, reliable communication (URLLC (Ultra-Reliable and Low Latency Communication)), using a single framework. URLLC is required to have a higher latency-reducing effect than eMBB and mMTC.

In this way, there is a likelihood that a plurality of services with different requirements for latency reduction will be co-present in future radio communication systems. So, for future radio communication systems, research is underway to support multiple TTIs (for example, long TTIs and short TTIs) of different time durations in the same carrier (also referred to as "CC," "cell," etc.).

Also, existing LTE systems support, for example, cross-carrier scheduling to schedule data of other cells using downlink control information corresponding to a given cell. However, when using a plurality of TTIs of different time durations on the same carrier, the problem lies in how to schedule and control user data and the like transmitted in different TTIs.

The present invention has been made in view of the above, and it is therefore an object of the present invention to provide a user terminal and a radio communication method, whereby, even when communication is carried out using TTIs of varying time durations, communication to use multiple cells can be implemented by controlling cross-carrier scheduling properly.

Solution to Problem

According to one aspect of the present invention, a user terminal communicates by using a plurality of cells, including at least a given cell to use a first TTI and a second TTI having a TTI length shorter than the first TTI, and this user terminal has a receiving section that receives, in the given cell, first downlink control information that is transmitted by using the first TTI and/or second downlink control information that is transmitted by using the second TTI, and a control section that controls receipt of a downlink shared channel and/or transmission of an uplink shared channel that is transmitted in another cell, based on the first downlink control information and/or the second downlink control information.

Advantageous Effects of Invention

According to the present invention, it is possible to provide a user terminal and a radio communication method, whereby, even when communication is carried out using TTIs of varying time durations, communication to use multiple cells can be implemented by controlling cross-carrier scheduling properly.

DESCRIPTION OF EMBODIMENTS

As one method of reducing communication latency in LTE, it may be possible to control transmission and/or receipt of signals by introducing shortened TTIs, which are shorter in duration than existing subframes (1 ms). Also, for 5G/NR, studies are in progress on how to allow UE to use different services simultaneously. In this case, the length of TTIs may be changed depending on services.

Note that a "TTI" as used herein refers to a time unit in which transmitting/receiving data's transport block, code block and/or codeword are transmitted and received. Given a TTI, the period of time (for example, the number of symbols) where a data transport block, code block and/or codeword are actually mapped may be shorter than the TTI.

For example, when a TTI is formed with a given number of symbols (for example, 14 symbols), transmitting/receiving data's transport block, code block, codeword and so forth can be transmitted and received in 1 or a given number of symbol periods among these symbols. If the number of symbols in which the transport block, code block and/or codeword of transmitting/receiving data are transmitted/received is smaller than the number of symbols constituting a TTI, reference signals, control signals and/or others can be mapped to the symbols in the TTI where no data is mapped.

Now, in either LTE or NR, UE may transmit and/or receive both long TTIs and short TTIs in 1 carrier, in the same period.

Figure 1:
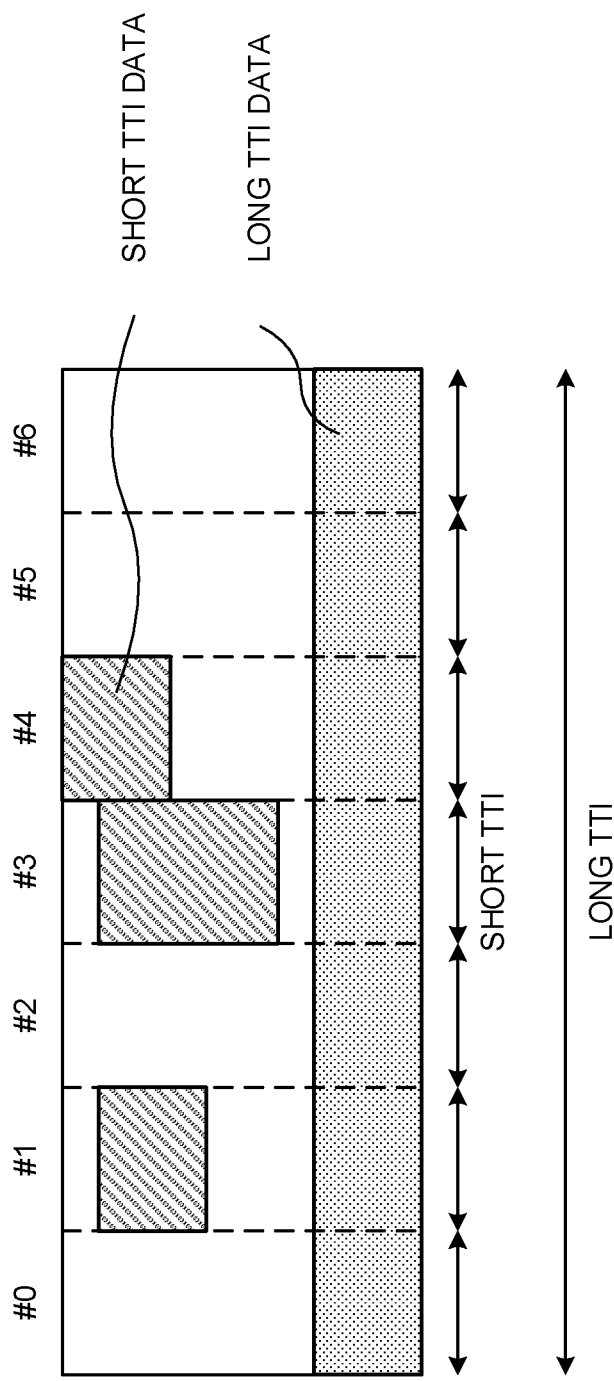
FIG. 1 is a diagram to show an example in which a long TTI and short TTIs co-exist.

FIG. 1 is a diagram to show an example in which a long TTI and short TTIs co-exist. In each TTI, transmitting/receiving data's transport block, code block, codeword and so on can be mapped. A long TTI refers to a TTI having a longer time duration than a short TTI, and may be referred to as a "normal TTI," a "normal subframe," a "long subframe," and the like. A short TTI refers to a TTI having a shorter time duration than a long TTI, and may be referred to as a "shortened TTI," a "partial TTI (partial or fractional TTI)," a "shortened subframe," a "partial subframe," and so on.

A long TTI, for example, has a time duration of 1 ms, and is comprised of 14 symbols (in the event normal cyclic prefix (CP) is used) or comprised of 12 symbols (in the event enhanced CP is used). A long TTI may be suitable for services that do not require strict latency reduction, such as eMBB and MTC.

A short TTI may be comprised of, for example, fewer symbols (for example, 2 symbols) than a long TTI, and the time duration of each symbol (symbol duration) may be the same as that of a long TTI (for example, 66.7 μs). Alternatively, a short TTI may be comprised of the same number of symbols as a long TTI, and the symbol duration of each symbol may be shorter than that of a long TTI. When using short TTIs, the time margin for processing (for example, encoding, decoding, etc.) in UEs and/or base stations grows, so that the processing latency can be reduced. Short TTIs may be suitable for services that require strict latency reduction, such as URLLC.

Note that, although examples will be shown in this specification where 7 short TTIs (for example, short TTI length=2 symbols long) are included in a long TTI (for example, long TTI length=1 ms), the format of each TTI is not limited to this. For example, a long TTI may contain up to 6 short TTIs. For example, long TTIs and/or short TTIs may have other time durations than the above examples, and short TTIs having a variety of short TTI lengths may be used within 1 long TTI. Also, any number of short TTIs may be contained in 1 long TTI.

Figure 2:
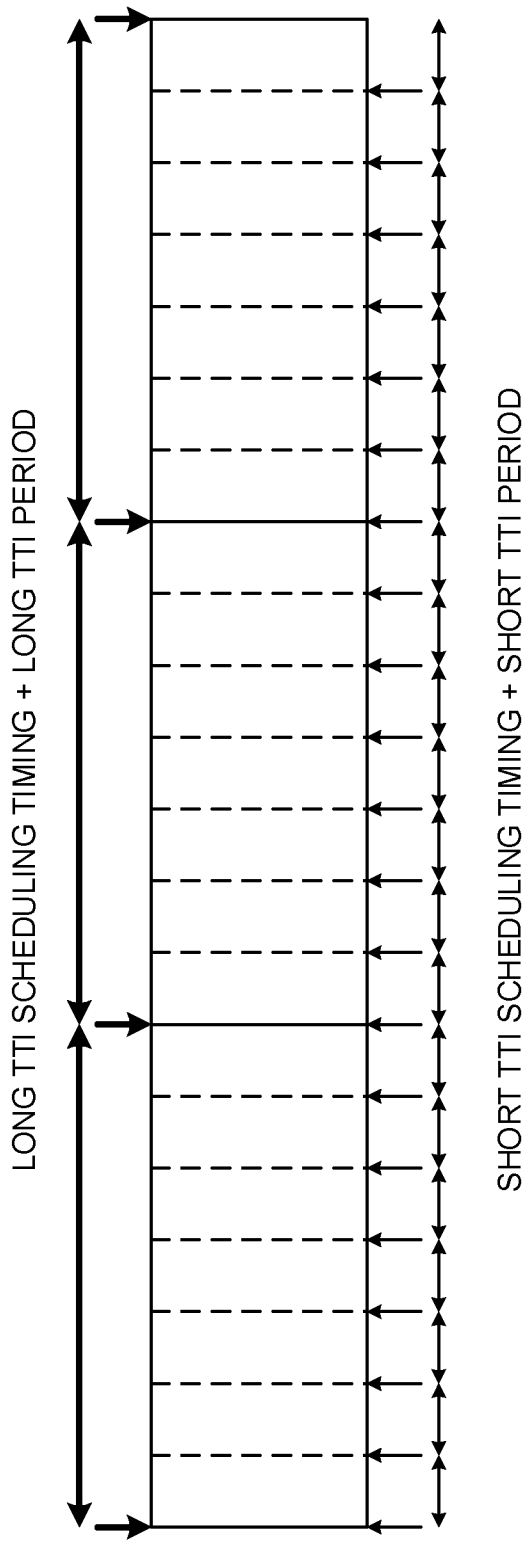
FIG. 2 is a diagram to show examples of long TTI and short TTI scheduling timings and periods.

FIG. 2 is a diagram to show examples of long TTI and short TTI scheduling timings and periods. In FIG. 2, a long TTI scheduling timing is provided in every long TTI period, and a short TTI scheduling timing is provided in every short TTI period. At each scheduling timing, scheduling information pertaining to the TTI starting from this timing (or a given TTI) may be reported.

Note that the scheduling information may be reported in downlink control information (DCI). For example, DCI to schedule receipt of DL data may be referred to as a "DL assignment," and DCI to schedule transmission of UL data may also be referred to as a "UL grant."

As shown in FIG. 2, it is preferable that short TTIs can be scheduled more often than long TTIs. Otherwise, the benefit of latency reduction by short TTIs would be limited. Therefore, it is preferable that UE monitors DCI for short TTIs more often than DCI for long TTIs.

Note that DL data that is scheduled is normally transmitted in the same TTI as that of the DL assignment, but this is by no means limiting. Also, UL data that is scheduled is normally transmitted in a different TTI from that of the UL grant (for example, transmitted in a given later TTI), but this is by no means limiting. For example, DL assignments and/or UL grants are transmitted in given TTIs, and the data scheduled by these may be transmitted in later TTIs.

Now, existing LTE systems support cross-carrier scheduling (CCS), in which allocation of PDSCH for other cells is reported to a user terminals, which is configured for multiple cells (CCs), by using the PDCCH of a given cell. In this case, a radio base station can use a CIF (Carrier Indicator Field) of 3 bits to specify in which cell the PDSCH should be detected.

Figure 3:
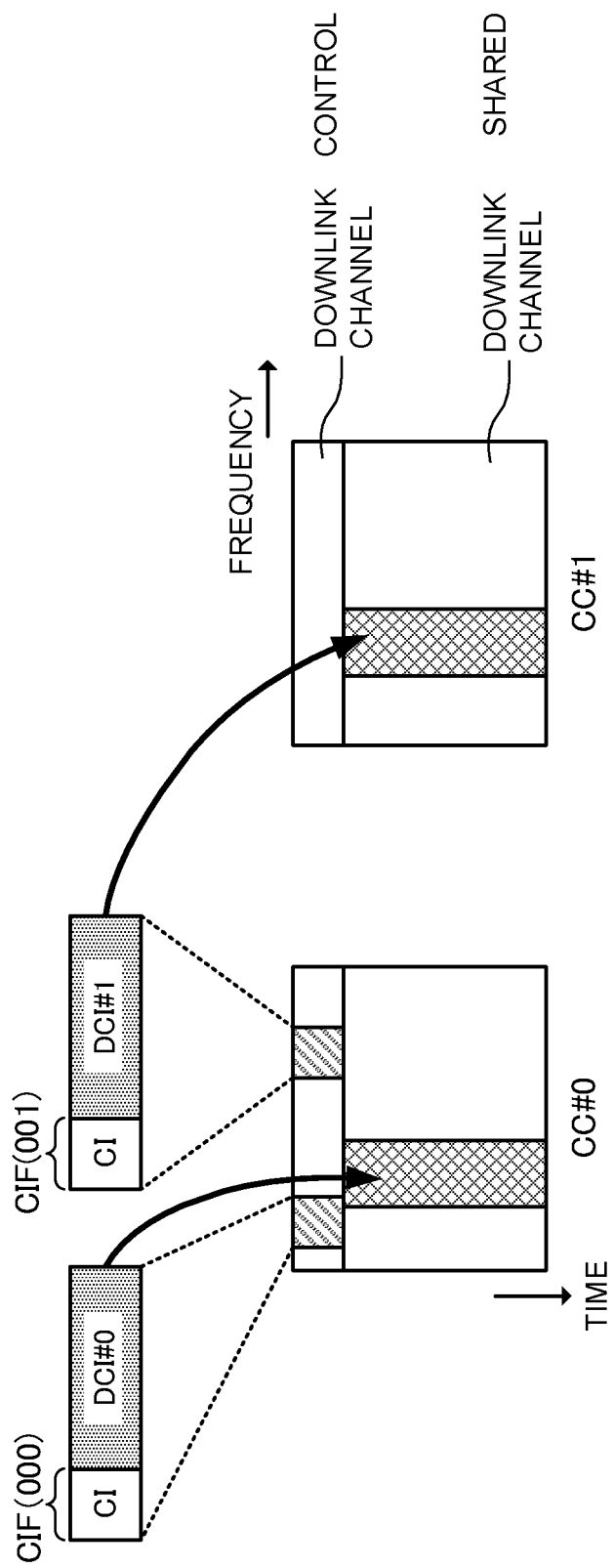
FIG. 3 is a diagram to show an example of cross-carrier scheduling in an existing LTE system.

When CA is applied to DL cross-carrier scheduling, the allocation of a downlink shared channel (PDSCH) and/or an uplink shared channel (PUSCH) for a given CC may be commanded using another CC's downlink control channel (PDCCH and/or EPDCCH) (see FIG. 3).

Referring to FIG. 3, downlink control information (DCI #1) for commanding allocation of the PDSCH and/or the PUSCH to be transmitted in CC #2 (for example, S-Cell) is multiplexed and transmitted on the PDCCH of another CC #0 (for example, P-Cell). In this case, the DCI format which provides a carrier indicator (CI) is used, so as to identify which CC (CC 0 or CC 1) the allocation of the PDSCH and/or the PUSCH indicated by the downlink control information (DCI #1) multiplexed upon the PDCCH of CC #1 pertains. In existing systems, a 3-bit carrier indicator field (CIF) is configured in downlink control information, and which CC this downlink control information corresponds to is reported to a user terminal. The user terminal performs the PDSCH receiving process and/or the PUSCH transmission process in a given CC based on the CIF included in the downlink control information.

In addition, when cross-carrier scheduling is applied to a cell (CC), information to indicate that cross-carrier scheduling is applied to this cell, and information to identify which cell (CC) is the scheduling cell are reported to the user terminal. These pieces of information—namely, information as to whether or not cross-carrier scheduling is used and information about the scheduling cell (the cell to transmit the CIF)—can be reported from the radio base station to the user terminal as higher layer control information (for example, RRC control information) for the cell to be scheduled.

Here, when a cell controls the allocation of the PDSCH and/or the PUSCH for another cell (CC) (that is, when a cell transmits DCI containing a CIF), this cell can be referred to as a "scheduling cell." Also, when a cell is configured for cross-carrier scheduling (that is, when a cell is scheduled based on a CIF), this cell may be referred to as a "scheduled cell."

Note that a scheduling cell (CC) can also send indications, by using CIFs, about the allocation of the PDSCH and/or the PUSCH for the scheduling cell (CC) itself. For example, FIG. 3 shows a case where cell #0 (CC #0) is the scheduling cell, and cell #0 (equivalent to CIF=0) and cell #1 (equivalent to CIF=1) are scheduled cells.

For example, the user terminal identifies cells having indices (for example, ServeCellIndex) corresponding to the 3-bit CIF values included in downlink control channels (PDCCH and/or EPDCCH) transmitted in the scheduling cell, and receives the PDSCHs allocated to the cell. For example, the CIF values 0 to 7 can be associated with ServeCellIndex #0 to #7. The association between the CIF values and the values of ServeCellIndex may be configured by higher layer signaling or the like. In this case, CIFs are configured in the PDCCH of the scheduling cell (CC), and higher layer signaling to associate each CIF value with a corresponding ServeCellIndex value of the scheduled cell (CC) is configured. Note that if no such configuration is used, the user terminal may assume that the CIF values 0 to 7 correspond to ServeCellIndex #0 to #7 on an as-is basis.

At this time, when decoding the downlink control channel in the common search space (CSS), the user terminal performs decoding on the assumption that there is no CIF. That is, in the event CIF is configured, the user terminal decodes control channels, in which CIF is configured, in the UE-specific search space (USS), and decodes control channels, in which CIF is not configured, in the common search space. A search space refers to the range in a downlink control channel that is monitored (blind-decoded) by the user terminal, and may be a UE-specific search space (USS), which is configured individually for each UE, a common search space (CSS), which is configured in common for each UE.

So, for future radio communication systems, research is underway to support multiple TTIs (for example, long TTIs and short TTIs) of different time durations in the same carrier. However, when using multiple TTIs of different time durations in the same carrier, the problem lies in how to control the scheduling of user data and the like transmitted in different TTIs (for example, cross-carrier scheduling).

So, the present inventors have focused on the downlink control information that is transmitted in each of a plurality of TTIs having different time durations, and come up with the idea of controlling scheduling by using this downlink control information.

That is, when short TTIs are configured in either the first cell or a plurality of cells including the first cell, a user terminal controls receipt in the first cell and other cells on the assumption that no CIF is configured in downlink control information, no matter in which cell the downlink control information is transmitted (first example). According to the first example, if short TTIs are used in 1 cell, the rule for not using cross-carrier scheduling is applied, so that it is possible to minimize the impact on existing systems associated with the introduction of short TTIs.

In another example, in the event short TTIs are configured in either the first cell or a plurality of cells including the first cell, the user terminal controls receipt in the first cell and other cells on the assumption that CIF is configured in the first downlink control information transmitted in the scheduling cell's long TTI, and that no CIF is configured in the second downlink control information transmitted in short TTIs (second example). According to the second example, the load for deciding whether to or not to use cross-carrier scheduling per short TTI that is transmitted in a short cycle compared to long TTIs can be reduced.

In another example, in the event short TTIs are configured in either the first cell or a plurality of cells including the first cell, the user terminal controls receipt in the first cell and other cells on the assumption that CIF is not configured in the first downlink control information transmitted in the scheduling cell's long TTI, and that CIF is configured in the second downlink control information transmitted in short TTIs (third example). According to the third example, cross-carrier scheduling can be applied per short TTI that is transmitted in a short cycle compared to long TTIs, so that the ability of short TTIs to reduce processing latency can be optimized sufficiently.

In another example, in the event short TTIs are configured in either the first cell or a plurality of cells including the first cell, the user terminal controls receipt in the first cell and other cells on the assumption that CIF is configured in the first downlink control information transmitted in the scheduling cell's long TTI and in the second downlink control information transmitted in short TTIs (fourth example). According to the fourth example, the user terminal no longer needs to monitor downlink control information in other cells' long TTIs or in every short TTI.

Now, embodiments of the present invention will be described in detail below with reference to the accompanying drawings. Note that the radio communication methods according to the herein-contained embodiments may be used individually or may be used in combination. Also, although the following description will illustrate cases in which a long TTI (for example, 1-ms TTI), which serves as the first TTI, contains 6 short TTIs, which serve as second TTIs, but the number of second TTIs is not limited to this. Also, although the following description will illustrate examples in which a downlink shared channel (PDSCH) and a shortened-TTI downlink shared channel (sPDSCH) are subject to cross-carrier scheduling, but embodiments of the present invention are not limited to these. It is equally possible to apply cross-carrier scheduling to an uplink shared channel (PUSCH) and a shortened-TTI uplink shared channel (sPUSCH).

First Example

The first example of the present invention relates to a user terminal that communicates by using a plurality of cells, including a cell to use short TTIs that have short TTI lengths than long TTIs. The user terminal has a receiving section that receives first downlink control information (PDCCH) that is transmitted in long TTIs in the first cell and/or second downlink control information (sPDCCH) that is transmitted in short TTIs, and a control section that controls the receipt of a downlink shared channel transmitted in the first cell, based on the first downlink control information and/or the second downlink control information. When short TTIs are used in 1 cell, the user terminal controls the receipt of the downlink shared channel on the assumption that the first downlink control information and the second downlink control information contain no carrier indicator.

In the first example, if short TTIs are applied at least to the first cell, the user terminal assumes that there is no CIF in the downlink control information (PDCCH, sPDCCH, etc.) received in long TTIs and short TTIs in the first cell. The UE then controls the receipt of downlink shared channels (PDSCH, sPDSCH, etc.) transmitted in long TTIs and/or short TTIs in the first cell.

If short TTIs are applied to the first cell, the user terminal performs receiving processes for downlink data for each cell, independently, on the assumption that cross-carrier scheduling to use CIF is not applied.

Thus, if short TTIs are applied at least to the first cell, then a fallback to a scheme for performing downlink data receiving processes and/or uplink data transmission processes based on downlink control information that is received independently per cell is possible, so that the complexity of cross-carrier scheduling for user terminals can be reduced.

Figure 4:
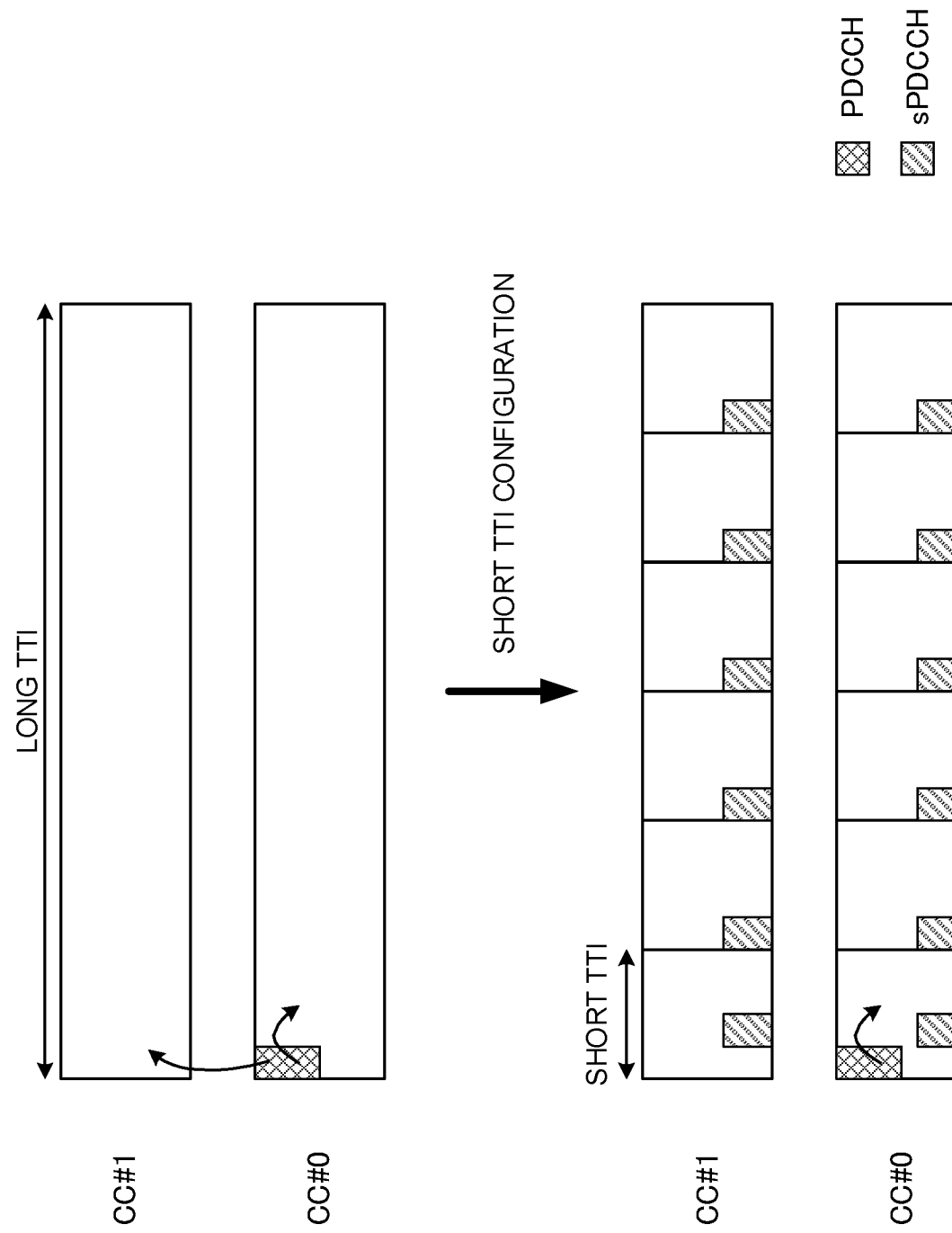
FIG. 4 is a diagram to show an example of scheduling according to a first example of the present invention.

FIG. 4 is a diagram to show how cross-carrier scheduling operation changes before and after short TTIs are configured in a cell. Before short TTIs are configured, the first downlink control information (PDCCH) transmitted in the long TTI configured in cell CC #0 (first cell) is used to run cross-carrier scheduling, in which the receipt of the downlink shared channel transmitted in the long TTI (or short TTIs) of cell CC #1 (second cell) is controlled. The association between values indicated by CIFs (CIF values) included in downlink control information and CC indices is determined in advance. The user terminal checks a CIF value, identifies the cell specified by the corresponding CC index, and controls the receipt of the downlink shared channel.

Now, assume that, for example, short TTIs are configured in cell CC #0 and cell CC #1 (the opposite is also possible). After short TTIs are configured, the user terminal controls the receipt of downlink data on the assumption that CIF is not configured either in the first downlink control information (PDCCH) transmitted in the long TTI configured in cell CC #0 or in the second downlink control information (sPDCCH) transmitted in short TTIs. That is, in cell CC #0, the user terminal uses the first downlink control information (PDCCH) transmitted in the long TTI to control the receipt of the downlink shared channel (PDSCH) transmitted in the long TTI.

Also, in cell CC #0, the user terminal uses the second downlink control information (sPDCCH) transmitted in every short TTI to control the receipt of the downlink shared channel (sPDSCH) transmitted in these short TTIs. Similarly, in cell CC #1, the user terminal uses the second downlink control information (sPDCCH) transmitted in every short TTI to control the receipt of the downlink shared channel (sPDSCH) transmitted in these short TTIs.

According to the first example, the cross-carrier scheduling operation to use CIFs (without using short TTI s) and the operation to control receipt based on downlink control information independently for each cell without placing CIFs in downlink control information can be switched dynamically.

Second Example

A second example of the present invention relates to a user terminal that communicates using a plurality of cells, including at least a first cell that uses long TTIs and short TTIs. This user terminal receives first downlink control information transmitted in long TTIs in the first cell and/or second downlink control information transmitted in short TTIs, and controls the receipt of the downlink shared channel transmitted in the second cell based on the first downlink control information and/or the second downlink control information.

For example, the user terminal uses a carrier indicator (CIF), which is included in the first downlink control information (PDCCH) transmitted in the first cell, to control the receipt of the downlink shared channel transmitted in short TTIs in the second cell. If long TTIs and short TTIs of different time lengths are used at least in the first cell, the user terminal may assume that CIF is included in the first downlink control information that is received in the long TTI for the first cell, but no CIF is included in the second downlink control information that is received in the short TTIs of the first cell. Then, the user terminal uses the first downlink control information received in the long TTI of the first cell to control the receipt of the downlink shared channel received in the second cell's short TTIs indicated by the CIF included in the first downlink control information.

Figure 5:
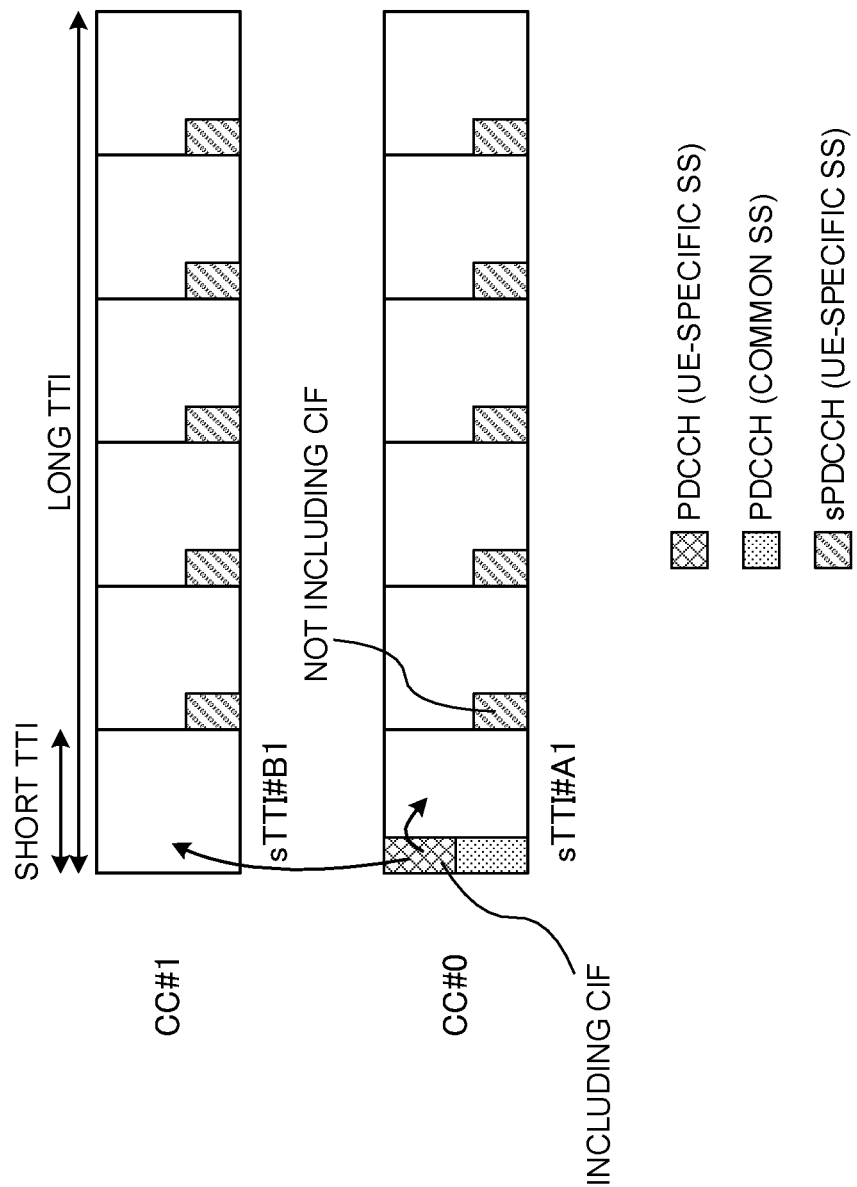
FIG. 5 is a diagram to show another example of scheduling according to a second example of the present invention.

FIG. 5 shows an example of cross-carrier scheduling operation, in which the first downlink control information transmitted in the long TTI of the first cell (CC #0) is used to control the receipt of the downlink shared channel transmitted in the short TTIs of the second cell (CC #1). Long TTIs and short TTIs are applied to cell CC #0 and cell CC #1. According to this example, in cells CC #0 and CC #1, a long TTI to match a 1-ms TTI is configured, and 6 short TTIs are configured in 1 long TTI.

In cell CC #0 (first cell), a user-specific search space (UE-SS) and a common search space (C-SS) are allocated to the first several symbols of the long TTI (1 subframe). In the user-specific search space (UE-SS), first downlink control information (PDCCH) including a CIF is scheduled. Also, a user-specific search space (UE-SS) is allocated in every short TTI that is scheduled in cell CC #0, except for the top short TTI (sTTI #A1).

In this example, the second downlink control information that is scheduled in the user-specific search space in each short TTI in cell CC #0 contains no CIF, except in the first short TTI (sTTI #A1). So, the second downlink control information, transmitted in every short TTI, is used to control the receipt of the downlink shared channel (sPDSCH) transmitted in the same short TTI.

In cell CC #1 (second cell), user-specific search spaces (UE-SSs) are allocated, except in the top short TTI (sTTI #B1). In this example, the second downlink control information that is scheduled in the user-specific search space of each short TTI in cell CC #0 contains no CIF, except for the top short TTI (sTTI #A1). For that reason, in cell CC #1, the second downlink control information transmitted in every short TTI except for the top short TTI (sTTI #B1) is used to control the receipt of the downlink shared channel (sPDSCH) transmitted in the same short TTI.

The radio base station designates cell CC #0 and cell CC #1 as a plurality of cells for use for a user terminal, and schedules long TTIs and short TTIs in cell CC #0 and cell CC #1. The radio base station configures a CIF in the first downlink control information transmitted in the long TTI of cell CC #0, which is the scheduling cell, and controls the receipt of the sPDSCH transmitted in the top short TTI (sTTI #B1) of cell CC #0, which is a scheduled cell.

Also, the radio base station allocates the first downlink control information, which controls the receipt of the sPDSCH transmitted in the top short sTTI (sTTI #A1), to the downlink control information transmitted in the long TTI of cell CC #0. Furthermore, the radio base station allocates the second downlink control information, which controls the receipt of the sPDSCH transmitted in every short TTI, to the user-specific search spaces of the short TTIs scheduled in cell CC #0 and cell CC #1 (except for the top short TTI).

Note that, when cell CC #0 is a PCell or a PSCell, no CIF is configured in the downlink control information (PDCCH) allocated to the common search space.

The user terminal monitors the long TTI's search spaces (UE-SS and C-SS) in cell CC #0, and detects the first downlink control information (PDCCH), including a CIF, from the user-specific search space. Meanwhile, the user terminal receives the sPDSCH transmitted in the top short TTI (sTTI #B1) in cell CC #1. Then, the user terminal controls the receipt of the sPDSCH for cell CC #1, which is specified by the CIF contained in the first downlink control information transmitted in cell CC #0, by using that control information. As a result of this, cross-carrier scheduling is implemented between cell CC #0 and cell CC #1. The user terminal transmits the HARQ-ACK in response to the cross-carrier-scheduled sPDSCH via a 1-ms-PUCCH or an sPUCCH.

Also, the user terminal monitors the user-specific search space (UE-SS) in short TTIs in cell CC #0, and detects the second downlink control information (sPDCCH), from the user-specific search space, on the assumption that no CIF is included. Then, the user terminal controls the receipt of the downlink shared channel (sPDSCH) transmitted in the same short TTI, by using the second downlink control information detected. Also, the user terminal monitors the user-specific search space (UE-SS) in short TTIs in cell CC #1, and detects the second downlink control information (sPDCCH), from the user-specific search space, on the assumption that no CIF is included. Then, the user terminal controls the receipt of the downlink shared channel (sPDSCH) transmitted in the same short TTI, by using the second downlink control information detected.

In this way, the user terminal may assume that the sPDCCH transmitted in short TTIs contains no CIF, so that the user terminal can reduce the load for deciding whether or not to use cross-carrier scheduling per short TTI that is transmitted in a short cycle compared to long TTIs.

The second example can be changed as follows. A user terminal, according to a variation, uses the carrier indicator (CIF) included in the first downlink control information transmitted in the first cell to control the receipt of the downlink shared channel transmitted in the long TTI in the second cell, and controls the receipt of the downlink shared channel transmitted in short TTIs in the second cell based on the second downlink control information transmitted in the short TTIs of the second cell.

Figure 6:
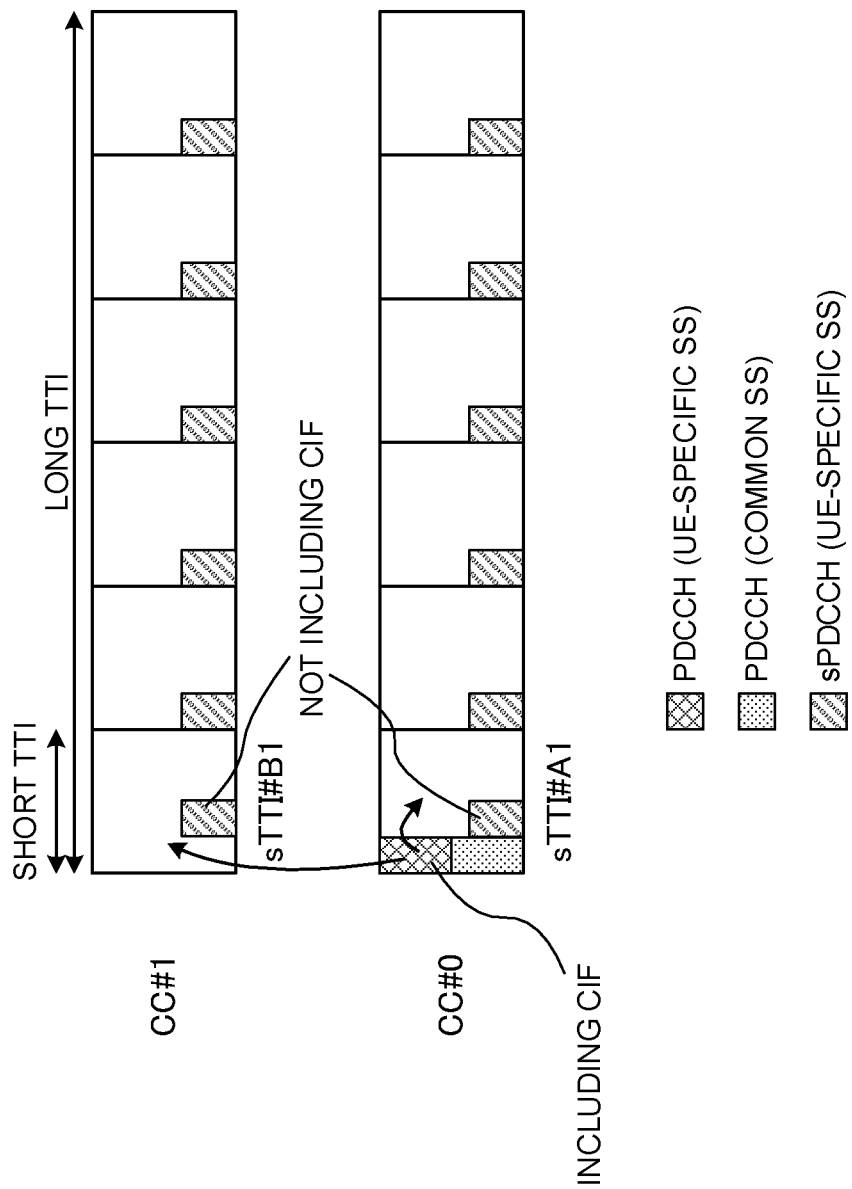
FIG. 6 is a diagram to show another example of scheduling according to a variation of the second example.

FIG. 6 shows a variation of the second example. FIG. 6 shows an example of cross-carrier scheduling operation, in which the first downlink control information transmitted in the long TTI of the first cell (CC #0) is used to control the receipt of a downlink shared channel transmitted in the long TTI for a second cell (CC #1).

In cell CC #0 (first cell), a user-specific search space (UE-SS) and a common search space (C-SS) are allocated to the first several symbols of the long TTI (1 subframe). In the user-specific search space (UE-SS), first downlink control information (PDCCH) including a CIF is scheduled. Also, a user-specific search space (UE-SS) is allocated in every short TTI that is scheduled in cell CC #0, except for the top short TTI (sTTI #A1).

In this example, in the user-specific search space of each short TTI, second downlink control information (sPDCCH) not including CIF is scheduled. So, the second downlink control information, transmitted in every short TTI, is used to control the receipt of the downlink shared channel (sPDSCH) that is transmitted in the same short TTI.

In cell CC #1 (second cell), the second downlink control information (sPDCCH), not including CIF, is scheduled in the user-specific search space (UE-SS) of each short TTI. So, the second downlink control information, transmitted in every short TTI, is used to control the receipt of the downlink shared channel (sPDSCH) transmitted in the same short TTI. Furthermore, in cell CC #1, a downlink shared channel (PDSCH) is scheduled in the long TTI, but downlink control information for controlling the receipt of PDSCH in cell CC #1 is transmitted in the long TTI in cell CC #0. That is, cross-carrier scheduling is used in cell CC #1, in which, while the sPDCCH is transmitted in every short TTI, the first downlink control information transmitted in the long TTI of cell CC #0 is used as downlink control information (PDCCH) for receiving the PDSCH.

The radio base station designates cell CC #0 and cell CC #1 as a plurality of cells for use for a user terminal, and schedules long TTIs and short TTIs in cell CC #0 and cell CC #1. In the long TTI and short TTIs for cell CC #0, which is the scheduling cell, downlink control information (PDCCH and sPDCCH) and a downlink shared channel (sPDSCH) are scheduled, as shown in FIG. 6. Also, second downlink control information (sPDCCH) and a downlink shared channel (sPDSCH) are scheduled in the short TTIs of cell CC #1, which is the scheduled cell, and PDSCH is scheduled in the long TTI.

The user terminal receives the first downlink control information (PDCCH) including a CIF, from the user-specific search space (UE-SS) of the long TTI in cell CC #0. The user terminal uses the received first downlink control information (PDCCH) to control the receipt of the PDSCH transmitted in the long TTI of cell CC #1, specified by the CIF. The user terminal transmits the HARQ-ACK in response to the cross-carrier-scheduled PDSCH via a 1-ms PUCCH or an sPUCCH.

Also, the user terminal monitors the user-specific search space (UE-SS) in short TTIs in cell CC #0 and cell CC #1, and detects the second downlink control information (sPDCCH), from the user-specific search space, on the assumption that no CIF is included. Then, the user terminal controls the receipt of the downlink shared channel (sPDSCH) transmitted in the same short TTI, by using the second downlink control information detected.

In this way, the user terminal may assume that the sPDCCH transmitted in short TTIs contains no CIF, so that the user terminal can reduce the load for deciding whether or not to use cross-carrier scheduling per short TTI that is transmitted in a short cycle compared to long TTIs.

Third Example

According to a third example of the present invention, the carrier indicator contained in second downlink control information (sPDCCH) transmitted in the first cell is used to control the receipt of the downlink shared channel transmitted in short TTIs in a second cell and/or the downlink shared channel transmitted in long TTIs.

In the third example, a user terminal assumes that the first downlink control information (PDCCH) transmitted in a long TTI in the first cell contains no CIF, and that the second downlink control information (sPDCCH) transmitted in short TTIs in the first cell contains CIF. The user terminal uses the second downlink control information (sPDCCH) transmitted in short TTIs in the first cell to control the receipt of the downlink shared channel (sPDSCH) transmitted in short TTIs in the second cell. The user terminal uses the second downlink control information (sPDCCH) transmitted in short TTIs in the first cell to control the receipt of the downlink shared channel (PDCCH) transmitted in the long TTI in the second cell.

Figure 7:
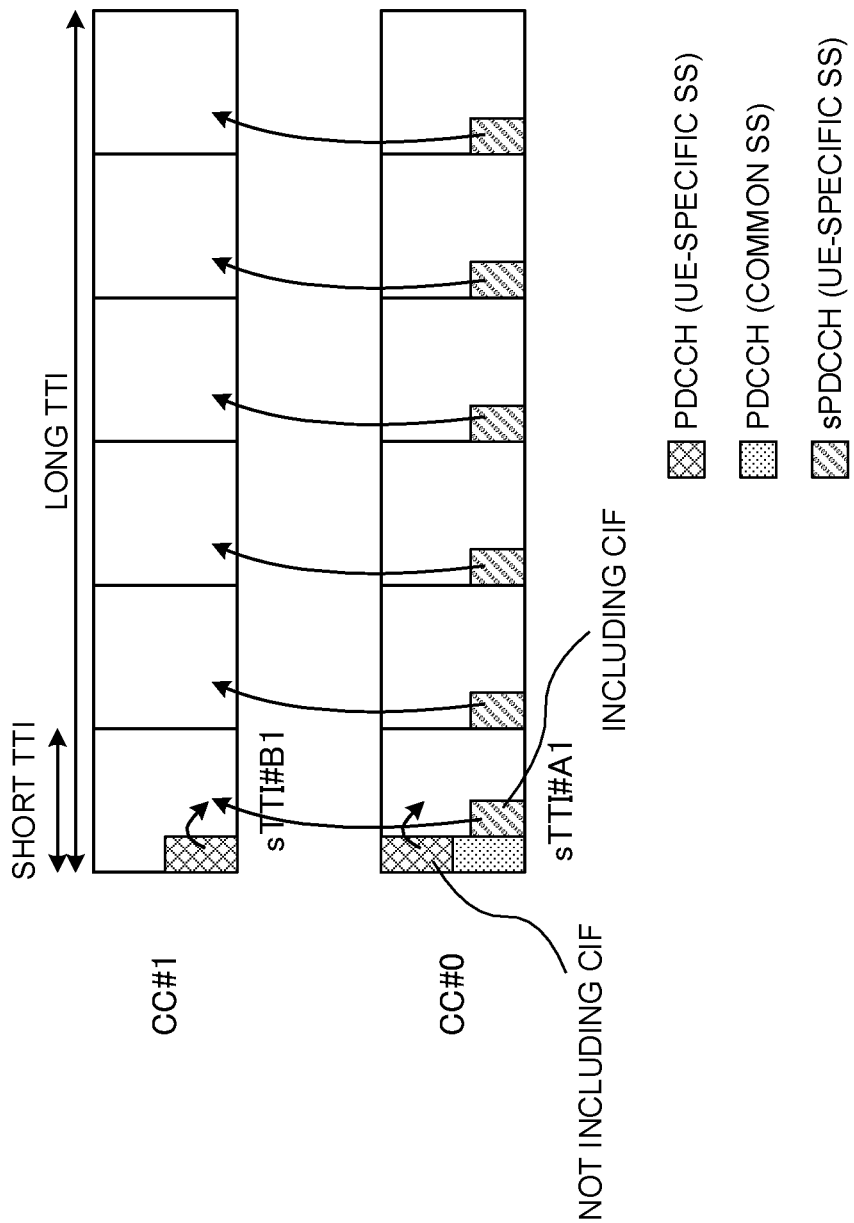
FIG. 7 is a diagram to show another example of scheduling according to a third example of the present invention.

FIG. 7 shows an example of cross-carrier scheduling operation, in which the second downlink control information transmitted in short TTIs in the first cell (CC #0) is used to control the receipt of the downlink shared channel transmitted in short TTIs for a second cell (CC #1).

In cell CC #0 (first cell), a user-specific search space (UE-SS) and a common search space (C-SS) are allocated to the first several symbols of the long TTI (1 subframe). In the user-specific search space (UE-SS), the first downlink control information (PDCCH), which contains no CIF, is scheduled. The first downlink control information (without CIF) transmitted in the long TTI of cell CC #0 is used to control the receipt of the downlink shared channel (PDSCH) transmitted in the long TTI for the same cell CC #0.

Also, a user-specific search space (UE-SS) is allocated to each short TTI scheduled in cell CC #0. In this example, in the user-specific search space of each short TTI, second downlink control information (sPDCCH) including CIF is scheduled. The second downlink control information (sPDCCH) transmitted in every short TTI of cell CC #0 is used to control the receipt of the downlink shared channel (sPDSCH) transmitted in every short TTI of cell CC #1. Although not shown in FIG. 7, the second downlink control information (sPDCCH) transmitted in every short TTI of cell CC #0 is used to control the receipt of the downlink shared channel (PDSCH) transmitted in the long TTI of cell CC #1.

In cell CC #1 (second cell), a user-specific search space (UE-SS) and a common search space (C-SS) are allocated to the first several symbols of the long TTI (1 subframe). In the user-specific search space (UE-SS), the first downlink control information (PDCCH), which contains no CIF, is scheduled. In each short TTI of cell CC #1, the second downlink control information (sPDCCH) is not transmitted.

The radio base station designates cell CC #0 and cell CC #1 as a plurality of cells for use for a user terminal, and schedules long TTIs and short TTIs in cell CC #0 and cell CC #1. The radio base station schedules, as shown in FIG. 7, a PDCCH not including a CIF and an sPDCCH including a CIF in the long TTI and the short TTIs for cell CC #0, which serves as the scheduling cell. Also, as shown in FIG. 7, the radio base station does not schedule the second downlink control information (sPDCCH) in the short TTI of cell CC #1 serving as a scheduled cell, and schedules the first downlink control information (PDCCH) not including a CIF only in the long TTI.

The user terminal receives the first downlink control information (PDCCH), which contains no CIF, in the long TTI of cell CC #0. The user terminal controls the receipt of the downlink shared channel (PDSCH) transmitted in the long TTI of cell CC #0, by using the received first downlink control information (PDCCH). Also, the user terminal receives the second downlink control information (sPDCCH), which contains a CIF, in each short TTI of cell CC #0. The user terminal uses the second downlink control information (sPDCCH) received from each short TTI of cell CC #0, to control the receipt of the downlink shared channel (sPDSCH) transmitted in every short TTI of cell CC #1.

Here, the user terminal uses mapping information, in which CIF values are associated with CC indices, in order to identify cells from the CIFs included in the downlink control information. The user terminal can use common mapping information for the CIFs transmitted in long TTIs and the CIFs transmitted in short TTIs. Using common mapping information can reduce the overhead involved in reporting configuration information. Alternatively, mapping information can be provided independently for the CIFs transmitted in long TTIs and for the CIFs transmitted in short TTIs. Each independent mapping information may be configured in user terminals, individually, by using higher layer signaling. In this case, cross-carrier scheduling can be controlled more flexibly. The user terminal transmits the HARQ-ACK in response to the cross-carrier-scheduled sPDSCH via a 1-ms-PUCCH or an sPUCCH of cell CC #1.

In this way, the receipt of the downlink shared channel transmitted in short TTIs in cell CC #1 is controlled by using downlink control information that is transmitted in short TTIs in cell CC #0, so that it is not necessary to transmit downlink control information (sPDCCH) in short TTIs in cell CC #1.

Fourth Example

According to a fourth example of the present invention, the receipt of the downlink shared channel (PDSCH) transmitted in the long TTI in the second cell is controlled using the carrier indicator contained in the first downlink control information (PDCCH) transmitted in the first cell, and the receipt of the downlink shared channel (sPDSCH) transmitted in short TTIs in the second cell is controlled using the carrier indicator contained in the second downlink control information (sPDCCH) transmitted in the first cell.

According to the fourth example, a user terminal assumes that the first downlink control information (PDCCH) transmitted in a long TTI in the first cell contains a CIF, and that the second downlink control information (sPDCCH) transmitted in short TTIs in the first cell contains CIF. The user terminal uses the first downlink control information (PDCCH) transmitted in the long TTI in the first cell to control the receipt of the downlink shared channel (PDSCH) transmitted in the long TTI in the second cell. The user terminal uses the second downlink control information (sPDCCH) transmitted in short TTIs in the first cell to control the receipt of the downlink shared channel (sPDSCH) transmitted in short TTIs in the second cell.

Figure 8:
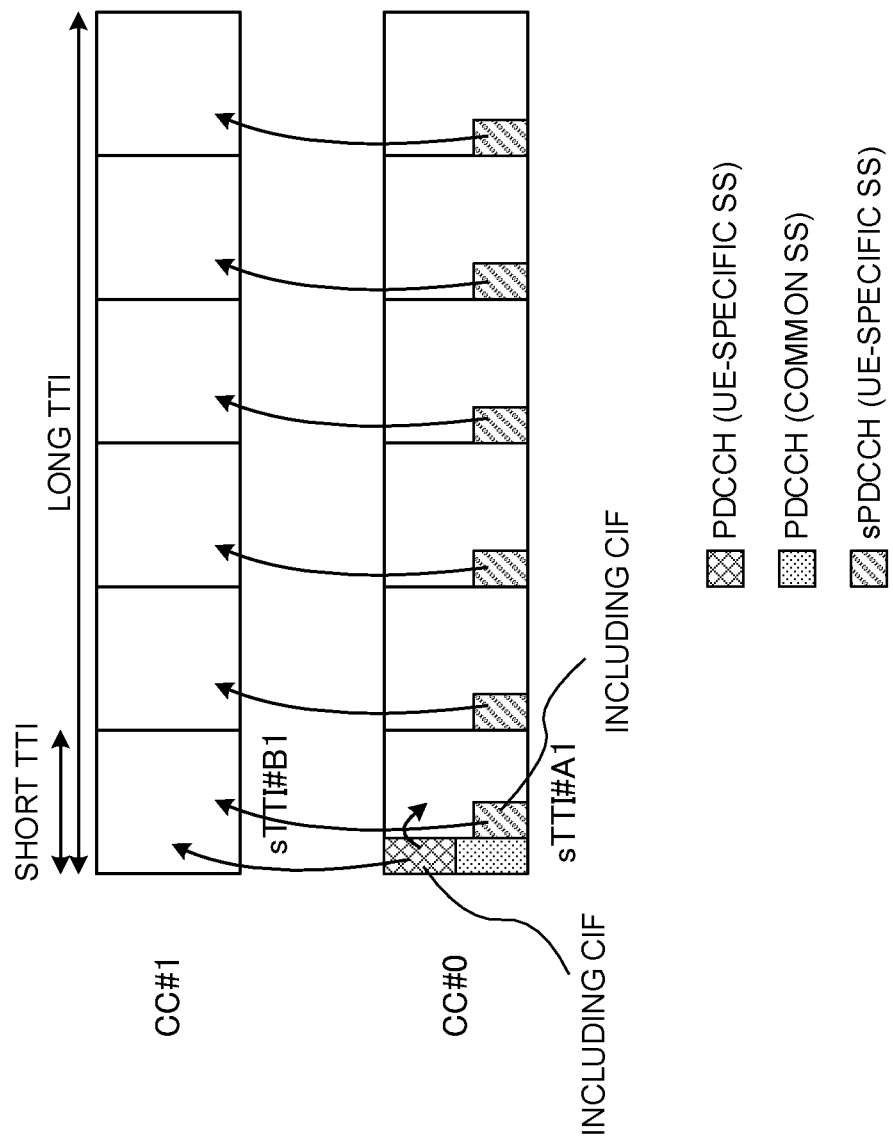
FIG. 8 is a diagram to show another example of scheduling according to a fourth example of the present invention.

FIG. 8 shows an example of cross-carrier scheduling operation for controlling the receipt of the downlink shared channel (PDSCH, sPDSCH) transmitted in the long TTI and short TTIs of the second cell (CC #1), by using downlink control information (PDCCH, sPDCCH) transmitted in the long TTI and short TTIs of the first cell (CC #0).

In cell CC #0 (first cell), a user-specific search space (UE-SS) and a common search space (C-SS) are allocated to the first several symbols of the long TTI (1 subframe). In the user-specific search space (UE-SS), first downlink control information (PDCCH) including a CIF is scheduled. The first downlink control information (with a CIF) transmitted in the long TTI of cell CC #0 is used to control the receipt of the downlink shared channel (PDSCH) transmitted in the long TTI in cell CC #1. Also, a user-specific search space (UE-SS) is allocated to each short TTI scheduled in cell CC #0.

In this example, in the user-specific search space of each short TTI, second downlink control information (sPDCCH) including CIF is scheduled. The second downlink control information transmitted in every short TTI of cell CC #0 is used to control the receipt of the downlink shared channel (sPDSCH) transmitted in every short TTI of cell CC #1.

In cell CC #1 (second cell), downlink control information is not transmitted in the long TTI (1 subframe) or in every short TTI (PDCCH, sPDCCH).

The radio base station designates cell CC #0 and cell CC #1 as a plurality of cells for use for the user terminal, and schedules long TTIs and short TTIs for cell CC #0 and cell CC #1. The radio base station schedules, as shown in FIG. 8, a PDCCH including a CIF and an sPDCCH including a CIF in the long TTI and the short TTIs for cell CC #0, which serves as the scheduling cell. Also, downlink control information (PDCCH, sPDCCH) is not scheduled in the long TTI and short TTIs for cell CC #1, which is a scheduled cell, as shown in FIG. 8.

The user terminal receives the first downlink control information (PDCCH), which contains a CIF, in the long TTI of cell CC #0. The user terminal controls the receipt of the downlink shared channel (PDSCH) transmitted in the long TTI of cell CC #1, by using the received first downlink control information (PDCCH). Also, the user terminal receives the second downlink control information (sPDCCH), which contains a CIF, in each short TTI of cell CC #0. The user terminal controls the receipt of the downlink shared channel (sPDSCH) transmitted in every short TTI of cell CC #1, which serves as a scheduled cell, based on the second downlink control information (sPDCCH) received from each short TTI of cell CC #0 (cross-carrier scheduling). The user terminal transmits the HARQ-ACK in response to the cross-carrier-scheduled PDSCH and sPDSCH of cell CC #1 via a 1-ms-PUCCH or an sPUCCH.

In this way, based on the downlink control information received in the long TTI and short TTIs for cell CC #0, the user terminal can control the receipt of the downlink shared channel (PDSCH, sPDSCH) transmitted in the long TTI and short TTIs for cell CC #1, so that the user terminal does not have to monitor downlink control information in the long TTI and short TTIs for cell CC #1.

Note that the first to fourth examples of the present invention are also applicable to cross-carrier scheduling of an uplink shared channel (PUSCH) and a shortened-TTI uplink shared channel (sPUSCH). In this case, the subframes in which the PDCCH and/or the sPDCCH are transmitted/received may be different from the subframes in which the PUSCH and/or the sPUSCH are transmitted.

(Radio Communication System)

Now, the structure of the radio communication system according to one embodiment of the present invention will be described below. In this radio communication system, communication is performed using one of the radio communication methods according to the herein-contained embodiments of the present invention, or a combination of these.

Figure 9:
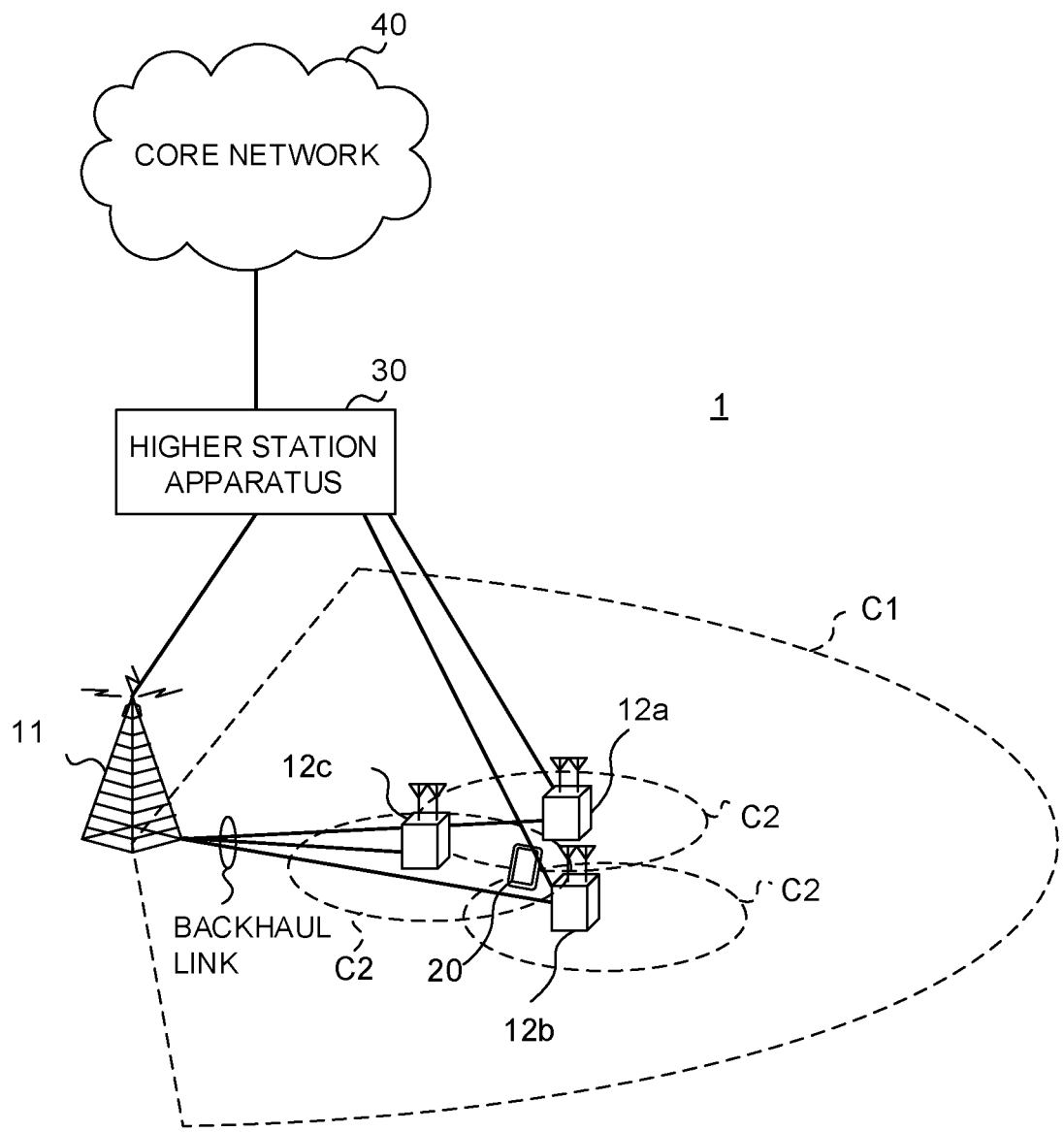
FIG. 9 is a diagram to show an exemplary schematic structure of a radio communication system according to the present embodiment.

FIG. 9 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G, "IMT-Advanced," "4G (4th generation mobile communication system)," "5G (5th generation mobile communication system)," "NR (New Radio," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12*a* to 12*c* that are placed within the macro cell C1 and that form small cells C2, which are narrower than the macro cell C1. Also, user terminals 20 are placed in the macro cell C1 and in each small cell C2. The arrangement and number of cells and user terminals 20 are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, 5 or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD) in each cell. Furthermore, in each cell (carrier), a single numerology may be used, or a plurality of different numerologies may be used.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between 2 radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier.

SC-FDMA is a single-carrier communication scheme to mitigate interference between terminals by dividing the system bandwidth into bands formed with one or contiguous resource blocks per terminal, and allowing a plurality of terminals to use mutually different bands. Note that the uplink and downlink radio access schemes are not limited to the combinations of these, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated in the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
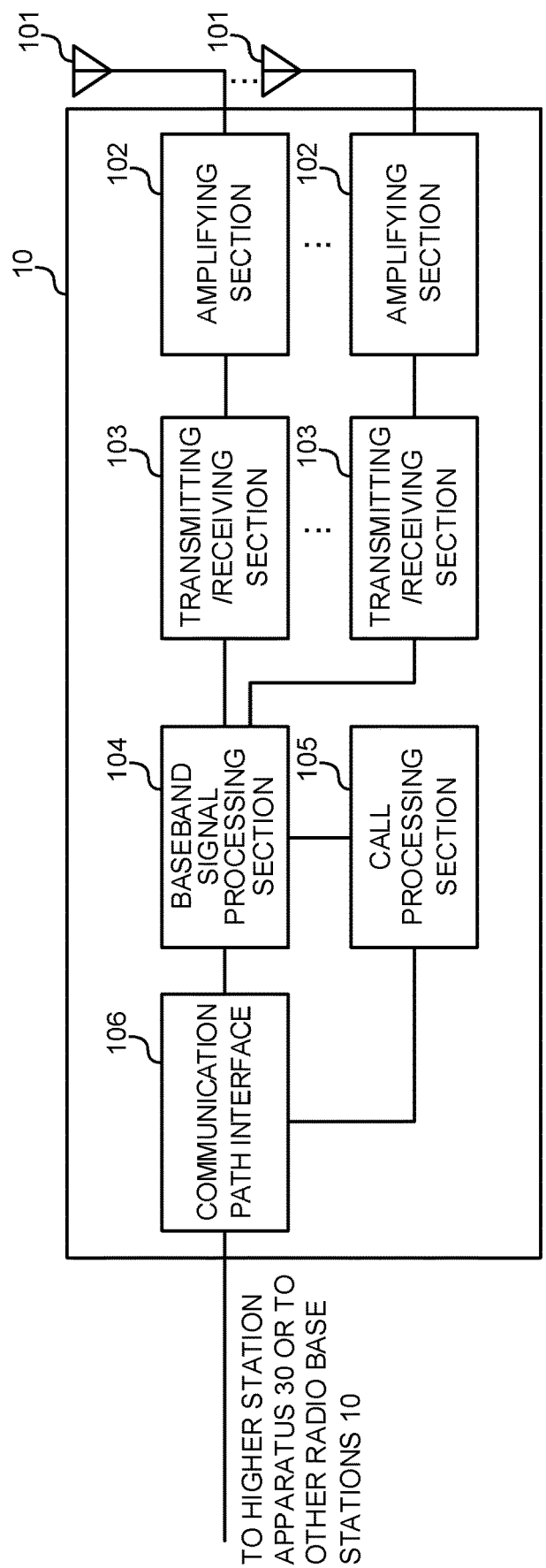
FIG. 10 is a diagram to show an exemplary overall structure of radio base station according to one embodiment of the present invention.

FIG. 10 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing of communication channels (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 receive data from a user terminal 20, which is transmitted via UL grant-free transmission, in which UL data is transmitted without UL transmission commands (UL grants) from the radio base station 10. After predetermined physical layer signaling is transmitted, the transmitting/receiving sections 103 may receive, from the user terminal 20, a delivery acknowledgment signal that indicating that the physical layer signaling has been received and/or has not been received.

In addition, the transmitting/receiving sections 103 may transmit higher layer signaling (for example, RRC signaling) for configuring UL grant-free transmission parameters, to the user terminal 20. In addition, the transmitting/receiving sections 103 may transmit at least one of L1 signaling for reporting parameters, L1 signaling for activation and L1 signaling for deactivation, to the user terminal 20.

Figure 11:
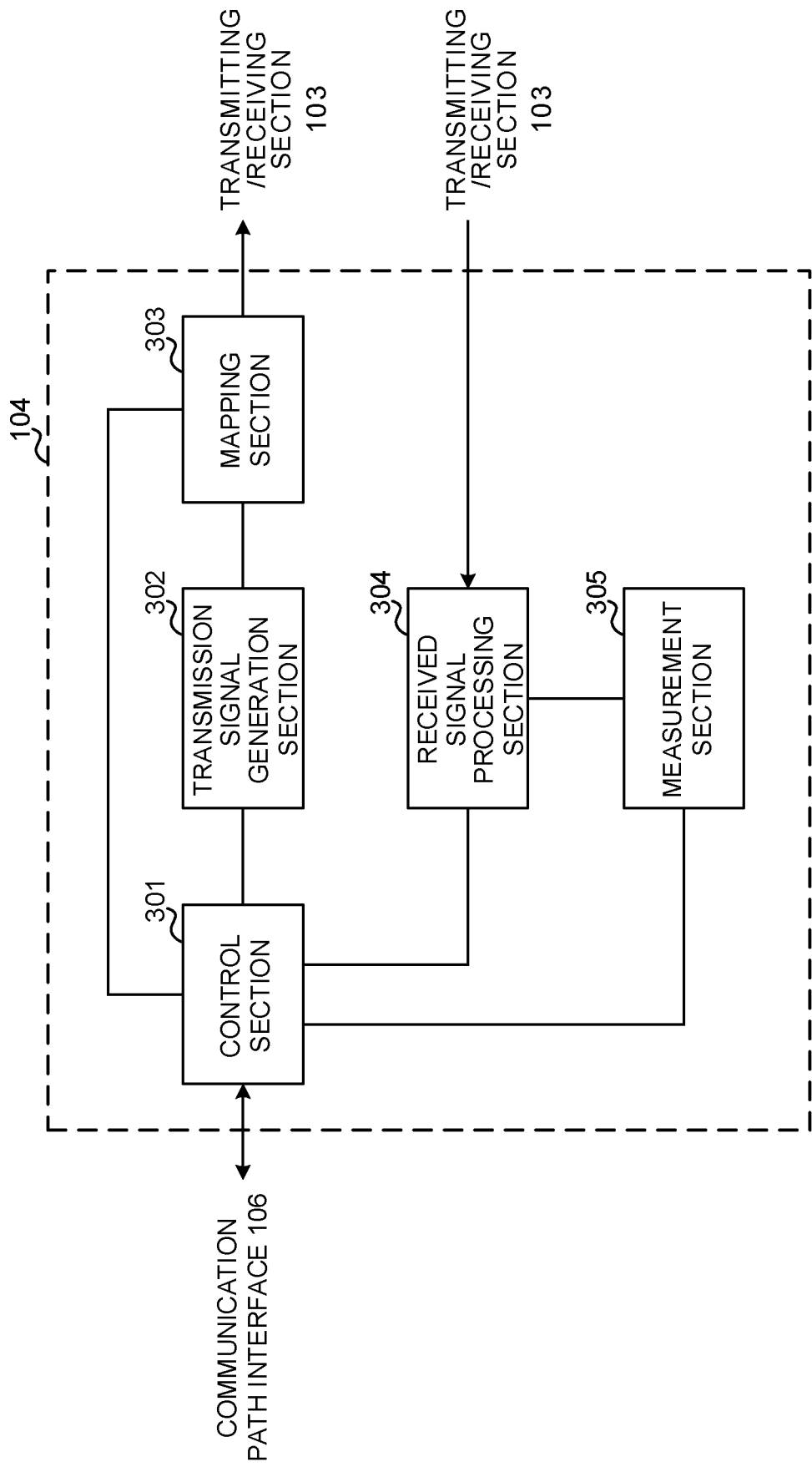
FIG. 11 is a diagram to show an exemplary functional structure of a radio base station according to one embodiment of the present invention.

FIG. 11 is a diagram to show an exemplary functional structure of a radio base station according to one embodiment of the present invention. Note that, although this example primarily shows functional blocks that pertain to characteristic parts of the present embodiment, it may be assumed that the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 401, for example, controls the generation of signals in the transmission signal generation section 402, the allocation of signals in the mapping section 403, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH/sPDSCH) and downlink control signals (for example, signals transmitted in the PDCCH/sPDCCH and/or the EPDCCH, such as delivery acknowledgment information). Also, the control section 301 controls the generation of downlink control signals, downlink data signals and so on, based on the results of deciding whether or not retransmission control is necessary for uplink data signals, and so on. Also, the control section 301 controls the scheduling of synchronization signals (for example, PSS (Primary Synchronization Signal)/SSS (Secondary Synchronization Signal)), downlink reference signals (for example, CRS, CSI-RS, DMRS, etc.) and so on.

Also, when short TTIs are configured in either the first cell or a plurality of cells including the first cell, the control section 301 exerts control so that a CIF is not configured regardless of in which cell downlink control information is transmitted (first example). In this case, the control section 301 dynamically switches between the cross-carrier scheduling operation to use CIFs (short TTIs are not used) and the operation to control receipt based on downlink control information independently for each cell, without placing CIF in downlink control information, for a user terminal, depending on the configuration of short TTIs. Also, when short TTIs are configured in either the first cell or a plurality of cells including the first cell, the control section 301 exerts control so that CIF is configured in the first downlink control information transmitted in the long TTI of the scheduling cell (PDCCH DCI), but CIF is not configured in the second downlink control information transmitted in short TTIs (sPDCCH DCI) (second example). The radio base station designates cell CC #0 and cell CC #1 as a plurality of cells for use for a user terminal, and schedules long TTIs and short TTIs in cell CC #0 and cell CC #1. The radio base station configures a CIF in the first downlink control information transmitted in the long TTI of cell CC #0, which is the scheduling cell, and controls the receipt of the sPDSCH transmitted in the top short TTI (sTTI #B1) of cell CC #0, which is a scheduled cell. Also, the radio base station allocates the first downlink control information, which controls the receipt of the sPDSCH transmitted in the top short sTTI (sTTI #A1), to the downlink control information transmitted in the long TTI of cell CC #0. Furthermore, the radio base station allocates the second downlink control information, which controls the receipt of the sPDSCH transmitted in every short TTI, to the user-specific search spaces of the short TTIs scheduled in cell CC #0 and cell CC #1 (except for the top short TTI). Also, as shown in FIG. 6, the control section 301 may schedule downlink control information (PDCCH and sPDCCH) and a downlink shared channel (sPDSCH) in the long TTI and short TTIs for cell CC #0, which serves as the scheduling cell. Also, the control section 301 may schedule the second downlink control information (sPDCCH) and the downlink shared channel (sPDSCH) in the short TTIs of cell CC #1, which serves as a scheduled cell, and schedule the PDSCH in the long TTI. Also, when short TTIs are configured in either the first cell or a plurality of cells including the first cell, the control section 301 may exert control so that CIF is not configured in the first downlink control information (PDCCH) transmitted in the long TTI of the scheduling cell, and CIF is configured in the second downlink control information (sPDCCH) transmitted in short TTIs (third example). In this case, the control section 301 can schedule a PDCCH not including a CIF and an sPDCCH including a CIF, in the long TTI and short TTIs of cell CC #0, which serves as the scheduling cell, as shown in FIG. 7. Also, as shown in FIG. 7, the radio base station does not schedule the second downlink control information (sPDCCH) in the short TTI of cell CC #1 serving as a scheduled cell, and schedules the first downlink control information (PDCCH) not including a CIF only in the long TTI. Also, the control section 301 may exert control so that CIF is configured in the first downlink control information (PDCCH) transmitted in the long TTI of the scheduling cell, and in the second downlink control information (sPDCCH) transmitted in short TTIs (fourth example). In this case, the control section 301 can schedule a PDCCH not including a CIF and an sPDCCH including a CIF, in the long TTI and short TTIs of cell CC #0, which serves as the scheduling cell, as shown in FIG. 8. Also, downlink control information (PDCCH, sPDCCH) is not scheduled in the long TTI and short TTIs for cell CC #1, which is a scheduled cell, as shown in FIG. 8.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and UL grants, which report uplink data allocation information, based on commands from the control section 301. DL assignments and UL grants are both DCI, in compliance with DCI formats. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. For example, the mapping shown in FIG. 4 to FIG. 8 is performed. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs information that has been decoded through receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI), and so on. The measurement results may be output to the control section 301.

(User Terminal)

Figure 12:
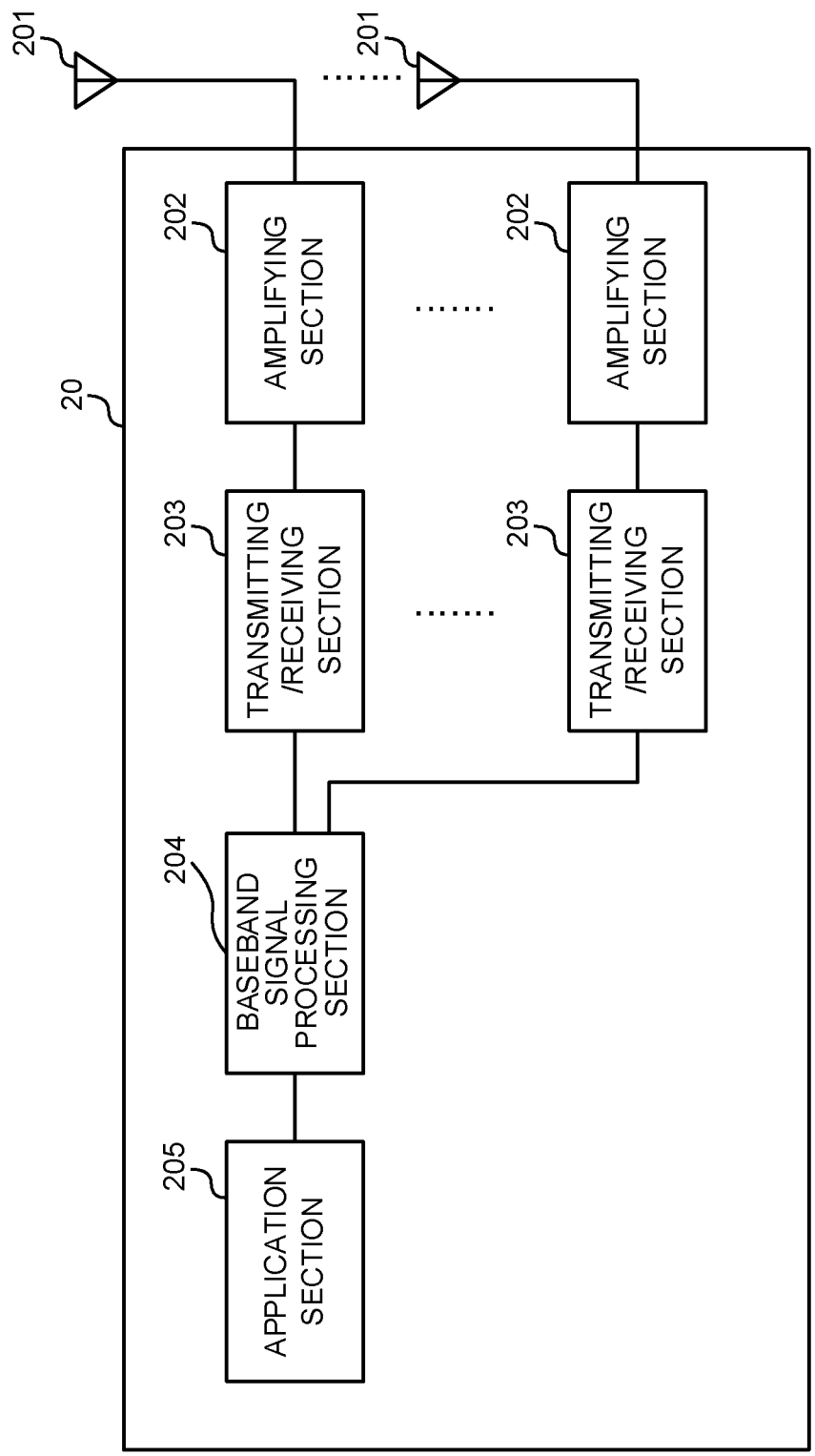
FIG. 12 is a diagram to show an exemplary overall structure of a user terminal according to one embodiment of the present invention.

FIG. 12 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information may be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit UL data without UL transmission commands (UL grants) from the radio base station 10. If predetermined physical layer signaling is received and/or not received, the transmitting/receiving sections 203 may transmit a delivery acknowledgment signal that indicates that the physical layer signaling has been received and/or has not been received.

In addition, the transmitting/receiving sections 203 receive higher layer signaling (for example, RRC signaling) for configuring UL grant-free transmission parameters. Also, the transmitting/receiving sections 203 may receive at least one of L1 signaling for reporting parameters, L1 signaling for activation and L1 signaling for deactivation, from the radio base station 10.

Figure 13:
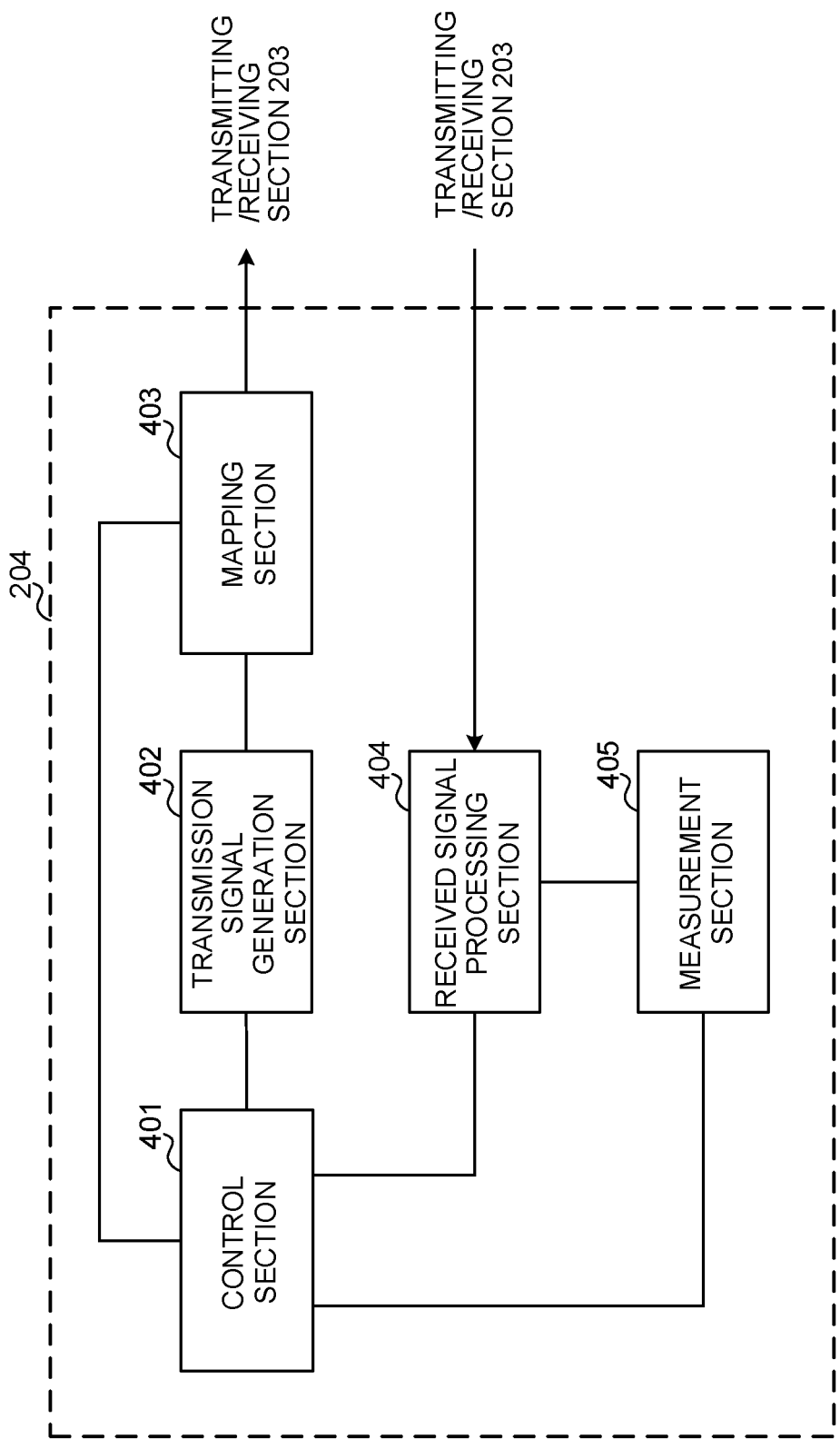
FIG. 13 is a diagram to show an exemplary functional structure of a user terminal according to one embodiment of the present invention.

FIG. 13 is a diagram to show an exemplary functional structure of a user terminal according to one embodiment of the present invention. Note that, although this example primarily shows functional blocks that pertain to characteristic parts of the present embodiment, it may be assumed that the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals (PDCCH, sPDCCH) and downlink data signals (PDSCH, sPDSCH), transmitted from the radio base station 10, from the received signal processing section 404. The control section 401 controls the generation of uplink control signals and/or uplink data signals based on the results of deciding whether or not retransmission control is necessary for the downlink control signals and/or downlink data signals, and so on.

That is, when short TTIs are configured in either the first cell or a plurality of cells including the first cell, a user terminal controls receipt in the first cell and other cells on the assumption that no CIF is configured in downlink control information, no matter in which cell the downlink control information is transmitted (first example). After short TTIs are configured, the user terminal controls the receipt of downlink data on the assumption that CIF is not configured either in the first downlink control information (PDCCH) transmitted in the long TTI configured in cell CC #0 or in the second downlink control information (sPDCCH) transmitted in short TTIs. That is, in cell CC #0, the user terminal uses the first downlink control information (PDCCH) transmitted in the long TTI to control the receipt of the downlink shared channel (PDSCH) transmitted in the long TTI. Also, in cell CC #0, the user terminal uses the second downlink control information (sPDCCH) transmitted in every short TTI to control the receipt of the downlink shared channel (sPDSCH) transmitted in these short TTIs. Similarly, in cell CC #1, the user terminal uses the second downlink control information (sPDCCH) transmitted in every short TTI to control the receipt of the downlink shared channel (sPDSCH) transmitted in these short TTIs. In another example, in the event short TTIs are configured in either the first cell or a plurality of cells including the first cell, the user terminal controls receipt in the first cell and other cells on the assumption that CIF is configured in the first downlink control information transmitted in the scheduling cell's long TTI, and that no CIF is configured in the second downlink control information transmitted in short TTIs (second example). In this case, the control section 401 detects the first downlink control information (PDCCH), including a CIF, from the long TTI in cell CC #0, and controls the receipt of the sPDSCH for cell CC #1, specified by the CIF included in the first downlink control information, by using this first downlink control information. In addition, the control section 401 detects second downlink control information (sPDCCH) from the short TTIs in cell CC #0, on the assumption that no CIF is included, and controls the receipt of the downlink shared channel (sPDSCH) transmitted in the same short TTI using the second downlink control information. The control section 401 detects the second downlink control information (sPDCCH) from the short TTIs in cell CC #1, on the assumption that no CIF is included, and controls the receipt of the downlink shared channel (sPDSCH) transmitted in the same short TTIs, by using the second downlink control information that is detected. A user terminal, according to a variation, uses the carrier indicator (CIF) included in the first downlink control information transmitted in the first cell to control the receipt of the downlink shared channel transmitted in the long TTI in the second cell, and controls the receipt of the downlink shared channel transmitted in short TTIs in the second cell based on the second downlink control information transmitted in the short TTIs of the second cell. In another example, in the event short TTIs are configured in either the first cell or a plurality of cells including the first cell, the user terminal controls receipt in the first cell and other cells on the assumption that CIF is configured in the first downlink control information transmitted in the scheduling cell's long TTI, and that no CIF is configured in the second downlink control information transmitted in short TTIs (second example). In this case, the control section 401 controls the receipt of the first downlink control information (PDCCH), not including a CIF, in the long TTI of cell CC #0. The user terminal controls the receipt of the downlink shared channel (PDSCH) transmitted in the long TTI of cell CC #0, by using the received first downlink control information (PDCCH). Also, in each short TTI of cell CC #0, the control section 401 controls the receipt of the second downlink control information (sPDCCH), including a CIF. The user terminal uses the second downlink control information (sPDCCH) received from each short TTI of cell CC #0, to control the receipt of the downlink shared channel (sPDSCH) transmitted in every short TTI of cell CC #1. Also, when short TTIs are configured in either the first cell or a plurality of cells including the first cell, the control section 401 controls the receipt of the first cell and other cells on the assumption that CIF is configured in the first downlink control information (PDCCH) transmitted in the long TTI of the scheduling cell and the second downlink control information (sPDCCH) transmitted in short TTIs (fourth example). In this case, the control section 401 controls the receipt of the first downlink control information (PDCCH), not including a CIF, in the long TTI of cell CC #0. The user terminal controls the receipt of the downlink shared channel (PDSCH) transmitted in the long TTI of cell CC #0, by using the received first downlink control information (PDCCH). Also, in each short TTI of cell CC #0, the control section 401 controls the receipt of the second downlink control information (sPDCCH), including a CIF. Based on the second downlink control information (sPDCCH) received from each short TTI of cell CC #0, the control section 401 controls the receipt of the downlink shared channel (sPDSCH) transmitted in every short TTI of cell CC #1.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information and/or channel state information (CSI) based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs information that has been decoded through receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
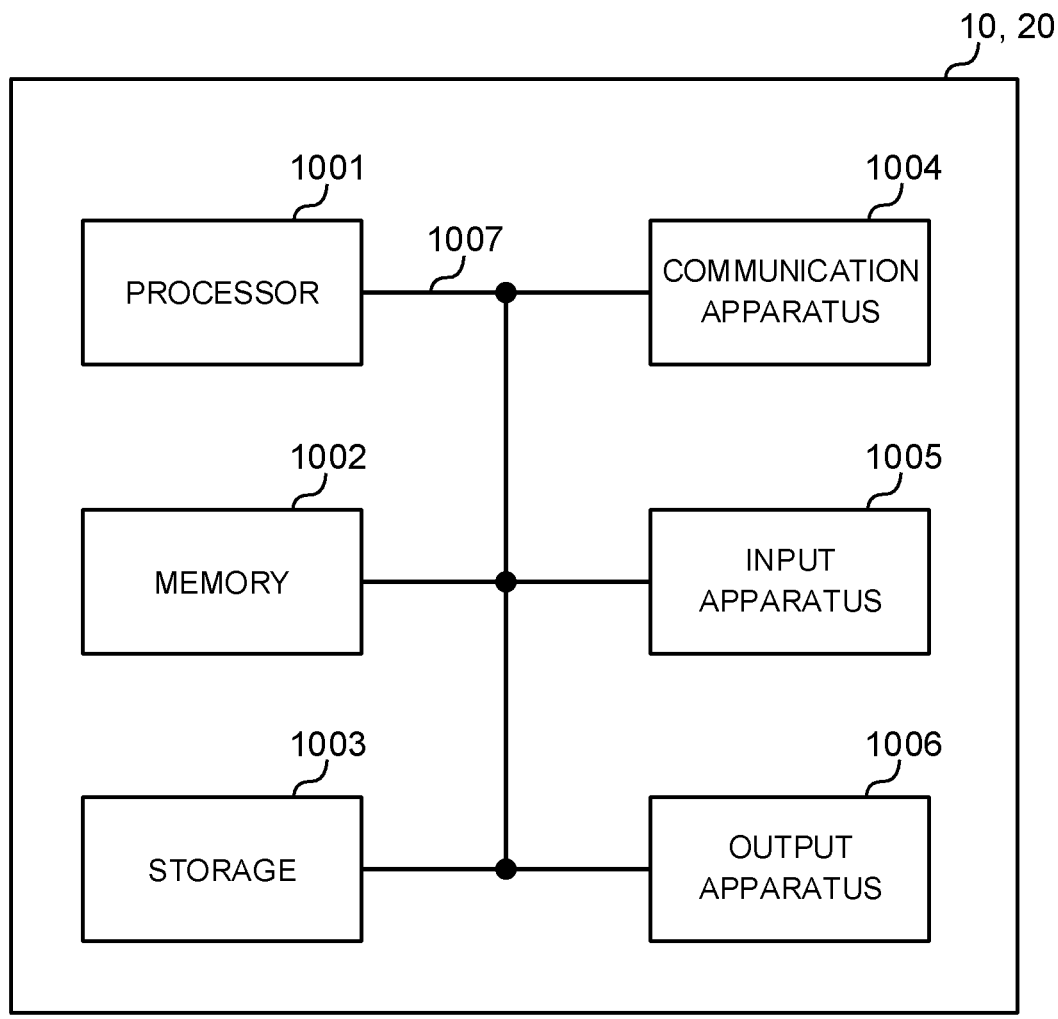
FIG. 14 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 14 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single-carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives at least one of a first downlink control information (DCI) transmitted in a transmission time interval (TTI) of 1 ms length and a second DCI transmitted in a TTI shorter than 1 ms, and
a processor that, when the first DCI is received, performs a control to apply cross-carrier scheduling based on a carrier indicator field (CIF) contained in the first DCI, and, when the second DCI is received, performs a control to not apply cross-carrier scheduling,
wherein the second DCI contains no CIF.

2. A radio communication method for a terminal, the method comprising:
receiving at least one of a first downlink control information (DCI) transmitted in a transmission time interval (TTI) of 1 ms length and a second DCI transmitted in a TTI shorter than 1 ms; and
when the first DCI is received, performing a control to apply cross-carrier scheduling based on a carrier indicator field (CIF) contained in the first DCI, and, when the second DCI is received, performing a control to not apply cross-carrier scheduling,
wherein the second DCI contains no CIF.

3. A base station comprising:
a transmitter that transmits at least one of a first downlink control information (DCI) transmitted in a transmission time interval (TTI) of 1 ms length and a second DCI transmitted in a TTI shorter than 1 ms; and
a processor that performs a control to contain a carrier indicator field (CIF) in the first DCI and a control to not contain a CIF in the second DCI.

4. A system comprising a terminal and a base station, wherein:
the terminal comprises:
a receiver that receives at least one of a first downlink control information (DCI) transmitted in a transmission time interval (TTI) of 1 ms length and a second DCI transmitted in a TTI shorter than 1 ms; and
a processor of the terminal that, when the first DCI is received, performs a control to apply cross-carrier scheduling based on a carrier indicator field (CIF) contained in the first DCI, and, when the second DCI is received, performs a control to not apply cross-carrier scheduling,
wherein the second DCI contains no CIF; and
the base station comprises:
a transmitter that transmits at least one of the first DCI and the second DCI; and
a processor of the base station that performs a control to contain a carrier indicator field (CIF) in the first DCI and a control to not contain a CIF in the second DCI.

* * * * *